United States Patent [19]

England

[11] Patent Number: 4,823,651
[45] Date of Patent: Apr. 25, 1989

[54] EXPANSION PLUG AND TOOL

[76] Inventor: Frank R. England, 4819 Old Mooringsport Rd., Shreveport, La. 71107

[21] Appl. No.: 85,141
[22] Filed: Aug. 14, 1987
[51] Int. Cl.[4] .............................................. B25B 13/02
[52] U.S. Cl. .................................. 81/124.4; 81/125.1; 81/437
[58] Field of Search ....... 81/124.4 O, 437 X, 125.1 X, 81/53.2; 411/34, 55

[56] References Cited

U.S. PATENT DOCUMENTS 1,438,269 12/1922 Sehrt ...................................... 81/53.2
1,919,666 7/1933 Patterson ............................... 411/34

FOREIGN PATENT DOCUMENTS 0000690 2/1868 United Kingdom .................. 411/34
0572436 6/1924 France ................................ 81/124.4

Primary Examiner—Frederick R. Schmidt
Assistant Examiner—Lawrence Cruz
Attorney, Agent, or Firm—John M. Harrison

[57] ABSTRACT

An expansion plug element for insertion in the inlet line of a gas meter for blocking the flow of gas to the meter and a tool for inserting the expansion plug in the inlet leg of the gas service line and removing the expansion plug from the inlet leg. The expansion plug is characterized by a carriage bolt fitted with a pair of washers spanning a flexible washer and provided with a nut for tightening the washers against the flexible washer and wedging the expansion plug in the inlet leg. The tool element further includes a tool sleeve having a nut slot in one end for engaging the nut on the carriage bolt and an internally-threaded, thread-engaging end for engaging the threads on the carriage bolt and removing the expansion plug from the inlet leg of the gas service line.

2 Claims, 1 Drawing Sheet

U.S. Patent
Apr. 25, 1989
4,823,651
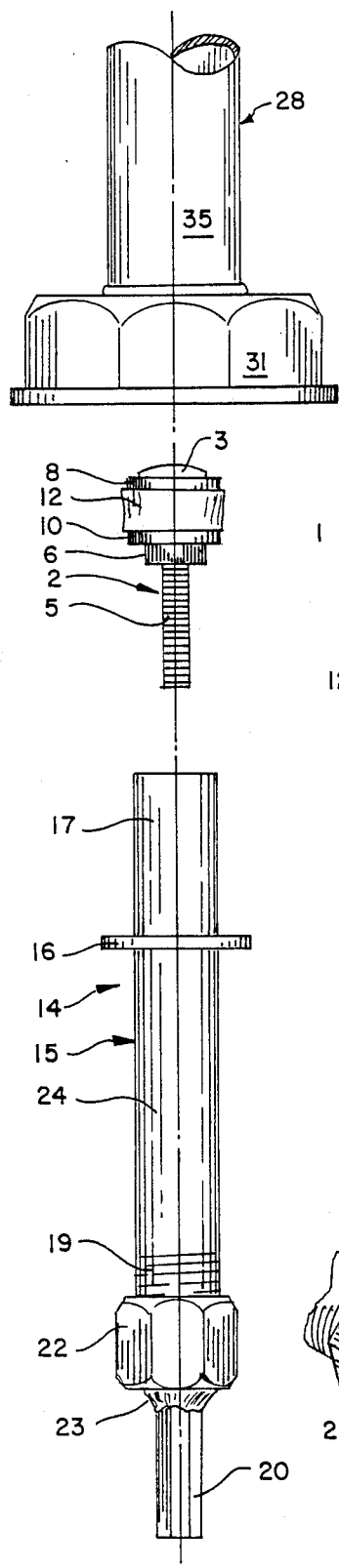
FIG. 1
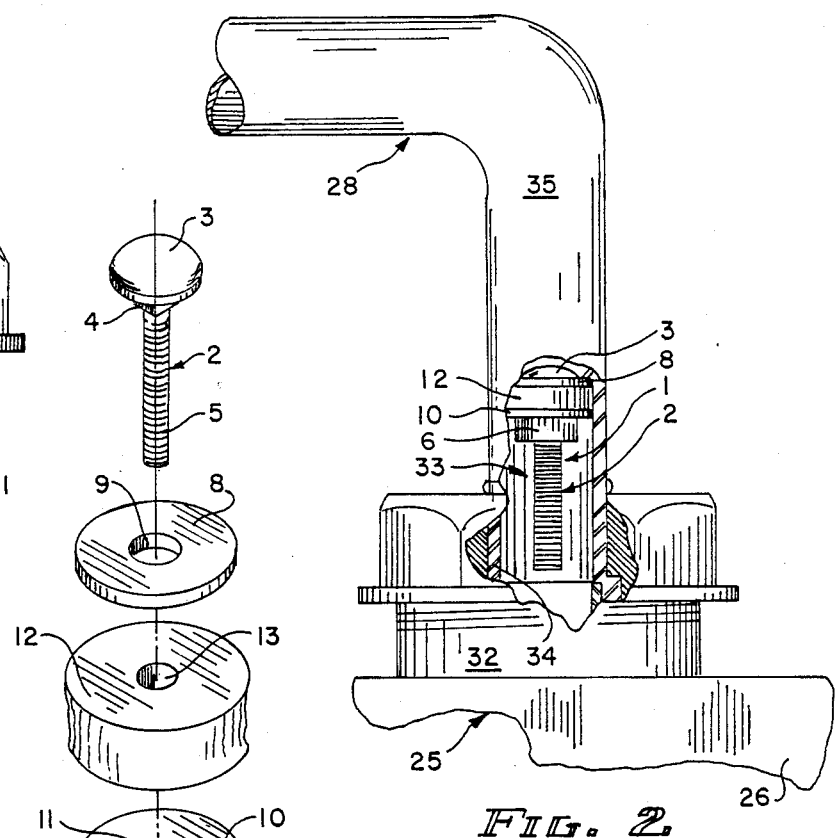
FIG. 2
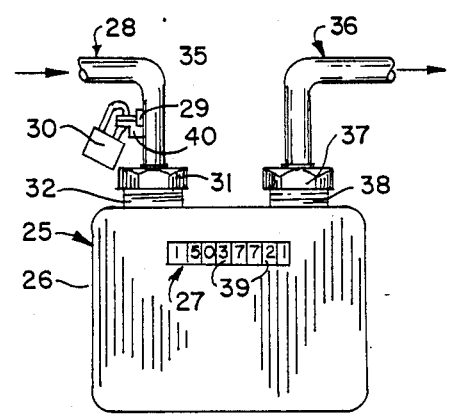
FIG. 3
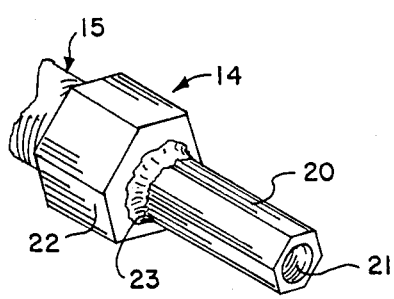
FIG. 5
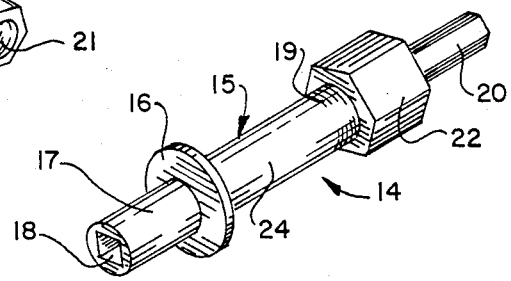
FIG. 4
FIG. 6

EXPANSION PLUG AND TOOL

BACKGROUND OF THE INVENTION

Field of the Invention

This invention relates to security means for gas meters and more particularly, to an expansion plug for insertion in the inlet leg of a gas service line at the gas meter, in order to prevent unauthorized use of gas from the gas main. The expansion plug of this invention is characterized by a carriage bolt provided with a pair of steel washers spanning a flexible washer and a nut threaded on the shank of the carriage bolt for expanding the flexible washer between the steel washers and wedging the expansion plug in the inlet leg of the gas meter service line. A plug tool is also provided for inserting the expansion plug in the inlet leg and removing the expansion plug from the inlet leg by a service representative of the gas company.

One of the problems realized in using gas meters to meter gas from an incoming gas main to a residence or commercial building is that of unauthorized use of the gas under circumstances where the gas service has been discontinued and the gas meter locked for non-payment of the gas bill. A typical ploy of such users is to break the lock which secures the service valve closing the inlet leg of the gas service line and rotate the service valve into the open position to again route the gas through the gas meter. Another illegal practice is to unflange the inlet swivel coupling which attaches the inlet leg of the service line to the gas meter and route the gas directly to the residence or office building, by-passing the gas meter.

Various locking mechanisms have been used to lock the gas meter service valve in closed configuration in the inlet leg of the gas service line in order to prevent unauthorized use of gas. However, most of these locking devices are easily removed by using lock cutter, hacksaws and even torches to free the service valves. In other cases, the locks are picked or otherwise opened by those skilled in such an art, to facilitate unauthorized use of the gas.

Accordingly, it is an object of this invention to provide a new and improved expansion plug for insertion in the inlet leg of a gas service line in order to prevent the unauthorized use of gas.

Another object of this invention is to provide an expansion plug for insertion in a gas line near a gas meter, in order to prevent the flow of gas through the line, which expansion plug is easily inserted in the service line, expanded to remain in line and retracted for removal from the line.

Still another object of this invention is to provide an expansion plug and companion tool for selectively inserting and removing the expansion plug into and out of a gas line, respectively, which expansion plug is characterized by a carriage bolt, a pair of steel washers fitted on the shank of the carriage bolt, with a flexible washer sandwiched between the steel washers and a nut threaded on the shank of the carriage bolt. One end of the tool is designed to engage and selectively tighten and loosen the nut on the carriage bolt when the expansion plug is inserted in a gas service line and removed from the line, respectively, and the tool further includes an opposite, internally-threaded end for engaging the threaded shank of the carriage bolt and removing the loosened expansion plug from the service line.

Yet another object of the invention is to provide a new and improved tool for inserting an expansion plug in a gas service line and removing the expansion plug from the gas service line, whcih tool is characterized by a nut-engaging end for engaging and selectively tightening and loosening the nut in the expansion plug and an internally-threaded end for engaging the threads of the carriage bolt element in the expansion plug, for removing the expansion plug from the service line.

SUMMARY OF THE INVENTION

These and other ojects of the invention are provided in a combination expansion plug and plug handling tool, which expansion plug is designed to block the inlet leg of a gas service line at the gas meter and which tool is adapted for inserting the expansion plug in the inlet leg and removing the expansion plug from the inlet leg. In a preferred embodiment, the expansion plug is characterized by a carriage bolt provided with a pair of steel washers with a flexible rubber washer sandwiched between the steel washers and a nut threaded on the shank of the carriage bolt, such that the nut can be tightened to expand the rubber washer between the steel washers by application of the tool when the expansion plug is inserted in the inlet leg, to prevent gas from flowing through the gas service line and the inlet leg to the gas meter. In another preferred embodiment, the opposite end of the tool is internally threaded for threadibly engaging the threads on the carriage bolt and removing the expansion plug from the gas service line.

BRIEF DESCRIPTION OF THE DRAWING

The invention will be better understood by reference to the accompanying drawings, wherein:

FIG. 1 is a front view of a preferred embodiment of the expansion plug and plug tool of this invention, illustrating use of the tool to insert the expansion plug in the inlet leg of a gas service line;

FIG. 2 is a side elevation, partially in section, of the expansion plug in functional configuration tightly inserted in the inlet leg of the gas service line;

FIG. 3 is an exploded view of a preferred embodiment of the expansion plug of this invention;

FIG. 4 is a perspective view of a preferred embodiment of the plug tool used in cooperation with the expansion plug illustrated in FIG. 3;

FIG. 5 is a perspective view, partially in section, of the threadengaging end of the plug tool illustrated in FIG. 4, and FIG. 6 is a front view of a conventional gas meter, more particularly illustrating the inlet and outlet service lines and a service valve with a lock securing the service valve in locked configuration for blocking the flow of gas through the gas inlet line.

DESCRIPTION OF THE PREFERRED EMBODIMENT

Referring initially to FIG. 6 of the drawing, a conventional gas meter is generally illustrated by reference numeral 25 and includes a meter housing 26, having an indication window 27 provided for reading the gas-indicating dials 39, located inside the meter housing 26. An inlet coupling nipple 32 projects from one side of the top of the meter housing 26 and an inlet swivel coupling 31 is threadibly attached to the threaded extending end of the inlet coupling nipple 32, in order to connect the inlet leg 35 of a gas service line 28 to the inlet coupling nipple 32. A service valve 29 is provided in the inlet leg 35 and is designed to selectively block the flow of gas through the inlet leg 35, to prevent gas from flowing through the gas meter 25. A lock 30 is inserted through an opening in the end of the plug valve 29 and through a lock flange 40, in order to lock the service valve 29 and prevent the unauthorized flow of gas through the gas inlet line 28 to the gas meter 25. An outlet coupling nipple 38 projects from an opposite side of the top of the meter housing 26 and an outlet swivel coupling 37 is threadibly attached to the threaded extending end of the outlet coupling nipple 38, in order to attach a gas outlet line 36 to the outlet coupling nipple 38, as illustrated. Accordingly, under ordinary circumstances when the service valve 29 is in the "open" configuration, gas flows in the direction of the arrows through the gas service line 28 into the meter housing 26 of the gas meter 25 and from the meter housing 26 through the gas outlet line 36, to a home or a commercial user. The volume of gas used is monitored by observing the indication window 27 and noting the numbers on the indicator dials 39.

Referring now to FIGS. 1 and 3 of the drawing, the expansion plug element of this invention is generally illustrated by reference numeral 1 and is characterized by a carriage bolt 2, having a bolt head 3 at one end and a downwardly-extending head flange 4 attached to the bolt head 3 for mounting a threaded shank 5. A top washer 8 is fitted on the threaded shank 5 adjacent the bolt head 3, with the top washer opening 9 engaging the head flange 4, in order to stabilize the top washer 8 uniformly against the bolt head 3. A flexible washer 12 is inserted on the threaded shank 5 adjacent the top washer 8 by means of the flexible washer opening 13 and is seated against the top washer 8, as illustrated in FIG. 1. A bottom washer 10 is then inserted on the threaded shank 5 adjacent the bottom surface of the flexible washer 12 by means of the bottom washer opening 11, such that the flexible washer 12 is sandwiched between the top washer 8 and the bottom washer 10, as further illustrated in FIG. 1. A nut 6, having internal nut threads 7, is threaded on the threaded shank 5 to a point immediately adjacent and touching the bottom washer 10, as further illustrated in FIG. 1. When the expansion plug 1 is in the relative poistion illustrated in FIG. 1, it is prepared for insertion in the open end of the inlet leg 35 of the gas inlet line 28, as further illustrated in FIG. 1.

Referring now to FIGS. 1, 4 and 5 of the drawing, a plug tool is generally illustrated by reference numeral 14 and includes a cylindrically-shaped tool sleeve 15, provided with a sleeve flange 16 which divides a central section 24 from the nut-engaging end 17 of the tool sleeve 15. The extending end of the central section 24 is further provided with sleeve threads 19, which threadibly receive an engaging nut 22 having a thread-engaging end 20, wleded thereon by means of a weld 23. As further illustrated in FIG. 4 of the drawing, the nut-engaging end 17 of the tool sleeve 15 is provided with a nut slot 18, which is shaped to conform to the nut 6, illustrated in FIGS. 1 and 3. Furthermore, as illustrated in FIG. 5, the thread-engaging end 20 of the tool sleeve 15 is provided with internally-seated engaging threads 21, which correspond in size to the threaded shank 5 of the carriage bolt 2 in the expansion plug 1.

Referring to FIGS. 1, 2 and 6 of the drawing, when it is desired to insert the expansion plug 1 in the inlet leg bore 33 of the inlet leg 35, the inlet swivel coupling 31 is initially uncoupled from the inlet coupling nipple 32, the nut-engaging end 17 of the tool sleeve 15 is extended over the threaded shank 5 of the carriage bolt 2 and the nut 6 is seated in the nut slot 18 of the nut-engaging end 17. The plug tool 14 is then manipulated to insert the expansion plug 1 through the open bottom of the inlet swivel coupling 31 and into the open end of the inlet leg 35. The plug tool 14 is subsequently roated in the clockwise direction to tighten the nut 6 on the threaded shank 5 of the carriage bolt 2 and cause the top washer 8 and the bottom washer 10 to squeeze and expand the flexible washer 12 against the inlet leg wall 34 of the inlet leg 35, as illustrated in FIG. 2. When the expansion plug 1 is tightly secured against the inlet leg wall 34, the inlet leg bore 33 of the inlet leg 35 is completely blocked and gas cannot flow through the gas service line 28. The plug tool 14 is then removed from contact with the expansion plug 1 and the inlet swivel coupling 31 is again threadibly attached to the inlet coupling nipple 32, as illustrated in FIGS. 2 and 6. This positioning of the expansion plug 1 in the inlet leg 35 of the gas service line 28 effectively prevents the unauthorized use of gas, either through the gas meter 25 or through the gas service line 28, if the gas service line 28 should be detached from the gas meter 25 by uncoupling of the inlet swivel coupling 31.

Referring again to FIGS. 1 and 2 of the drawing, when it is desired to remove the expansion plug 1 from its blocking position in the inlet leg 35 of the gas service line 28 as illustrated in FIG. 2, the inlet swivel coupling 31 is again disconnected from the inlet coupling nipple 32. The nut-engaging end 17 of the total sleeve 15 is again inserted over the threaded shank 5, to seat the nut 6 in the nut slot 18. The plug tool 14 is then manipulated in the counterclockwise direction, to loosen the nut 6 and cause the top washer 8 and the bottom washer 10 to reduce the pressure on the flexible washer 12 and thereby loosen the flexible washer 12 from contact with the inlet leg wall 34 of the inlet leg 35. The nut-engaging end 17 of the plug tool 14 is then disengaged from the nut 6, the plug tool 14 is reversed and the thread-engaging end 20 is then aligned with the threaded shank 5 of the carriage bolt 2 in the expansion plug 1. The internal engaging threads 21 provided in the thread-engaging end 20 are threadibly seated on the threaded shank 5 of the carriage bolt 2 and the plug tool 14 is pulled downwardly to remove the expansion plug 1 from the inlet leg bore 33 of the inlet leg 35. The thread-engaging end 20 of the plug tool 14 is then disengaged from the threaded shank 5 and the expansion plug 1 is ready for re-insertion in the inlet leg 35 of a gas service line 28, as heretofore described.

It will be appreciated by those skilled in the art that the expansion plug and plug tool combination of this invention is characterized by convenience and flexibility and is designed to provide a means for blocking the flow of gas through a gas inlet or service line which cannot be easily removed by an illegal user without the specially designed plug tool element disclosed herein. Furthermore, the expansion plug and plug tool are simple in design and easy to use and may be adapted for use in a gas service line of substantially any dimension and design. It will further be appreciated by those skilled in the art that the expansion plug can be used in the place of a lock, such that the service valve 29 illustrated in FIG. 6 does not need to be secured with a lock 30, in order to prevent the unauthorized use of gas. Accordingly, the expansion valve 1 eliminates the expensive provision of multiple locks 30, which are often cut from the plug valve 29, in order to illegally gain access gain access to the flow of gas through the gas inlet line 28. Since the internal diameter of the inlet leg 35 is usually about one inch in width, the flexible washer 12 should be 15/16 of an inch in diameter. Furthermore, in a most preferred embodiment of the invention the flexible washer 12 is constructed of gum rubber to provide optimum friction in engaging the inlet leg 35.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In an expansion plug for insertion in a gas conduit, said expansion plug characterized by a bolt having a head and a threaded shank extending from said head, a pair of rigid washers provided on said shank and a flexible washer sandwiched between said rigid washers and a nut threaded on said shank and seated against one of said rigid washers, the improvement in combination therewith comprising a tool for selectively inserting said expansion plug in the gas conduit and removing said expansion plug from the gas conduit, said tool comprising elongated sleeve means; a nut slot provided in one end of said sleeve means for engaging said nut in said expansion plug and selectively tightening and loosening said expansion plug in the gas conduit, responsive to rotation of said sleeve means; sleeve threads provided on one end of said sleeve means, an engaging nut adapted for threading on said sleeve threads and a thread-engaging end carried by said engaging nut and wherein said engaging threads are provided in said thread-engaging end and a set of engaging threads provided in the opposite end of said sleeve means for threadibly engaging said threaded shank and removing said expansion plug from the gas conduit.

2. The expansion plug of claim 1 further comprising a sleeve flange provided on said sleeve means intermediate said one end and said opposite end for gripping said sleeve means.

* * * * *